United States Patent
Bartolomé Rodrigo (10) Patent No.: US 9,465,819 B2
(45) Date of Patent: Oct. 11, 2016

(54) DISTRIBUTED DATABASE

(75) Inventor: Maria Cruz Bartolomé Rodrigo, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 359 days.

(21) Appl. No.: 13/981,826

(22) PCT Filed: Jan. 31, 2011

(86) PCT No.: PCT/EP2011/051301
§ 371 (c)(1),
(2), (4) Date: Jul. 25, 2013

(87) PCT Pub. No.: WO2012/103920
PCT Pub. Date: Aug. 9, 2012

(65) Prior Publication Data
US 2013/0311424 A1    Nov. 21, 2013

(51) Int. Cl.
*G06F 17/30* (2006.01)

(52) U.S. Cl.
CPC ... *G06F 17/30289* (2013.01); *G06F 17/30575* (2013.01)

(58) Field of Classification Search
CPC .................. G06F 17/30289; G06F 17/30575
See application file for complete search history.

(56) References Cited

U.S. PATENT DOCUMENTS

| | | | |
|---|---|---|---|
| 8,996,482 B1 * | 3/2015 | Singh | G06F 17/30575 707/698 |
| 2003/0182204 A1 * | 9/2003 | Rhee | 705/26 |
| 2003/0182264 A1 * | 9/2003 | Wilding et al. | 707/1 |
| 2005/0097286 A1 | 5/2005 | Karlsson et al. | |
| 2007/0282915 A1 * | 12/2007 | Vosshall | G06F 17/30575 |
| 2008/0256112 A1 | 10/2008 | Prudden | |
| 2008/0263389 A1 | 10/2008 | Ku et al. | |
| 2013/0185329 A1 * | 7/2013 | Bartolome Rodrigo | 707/770 |

OTHER PUBLICATIONS

Bakiras et al., "Combining Replica Placement and Caching Technique in Content Distribution Networks" Science Direct, Computer Communications, vol. 28, consisting of 12-pages numbered 1062-1073, (Mar. 12, 2005).

Sivasubramanian et al., "Replicating_Web_Applications_on_Demand", Proceedings of the 2004 IEEE International Conference on Services Computing (SCC '04), 0-7695-2225-4/04, consisting of 10-pages, (Apr. 2004).

International Search Report and Written Opinion dated Jan. 8, 2013 for International Application No. PCT/EP2011/051301, International Filing Date: Jan. 31, 2011 consisting of 11 pages.

(Continued)

*Primary Examiner* — Robert Beausoliel, Jr.
*Assistant Examiner* — Susan F Rayyan
(74) *Attorney, Agent, or Firm* — Christopher & Weisberg, P.A.

(57) ABSTRACT

A method of operating a database node of a distributed database is provided. The distributed database includes a plurality of database nodes each storing a set of data. A latency that occurs when the database node contacts a further database node in order to respond to one or more data requests that relate to a subset of data that is one of stored and intended to stored at the further database node is measured. An average latency value for communicating with each of the database nodes in the distributed database is calculated. Notifications reporting the average latency values to data distribution optimization functions in the distributed database are sent. A latency measure is reported to a further node of the distributed database.

32 Claims, 5 Drawing Sheets

(56) References Cited

OTHER PUBLICATIONS

European First Examination Report dated Jul. 5, 2016 for European Regional Phase Application Serial No. 11 702 174.1-1952, European Regional Phase Entry Date: Aug. 28, 2013 consisting of 10-pages.

W.W. Chu, Optimal File Allocation in a Multiple Computer System:, Browse Journals & Magazines, Published in: IEEE Transactions on Computers, vol. C-18(10):885-889, XP055281581, ISSN: 0018-9340, DOI: 10.1109/T-C.1969.222542 Publication Date: Oct. 1969 consisting of 5-pages.

Howard L. Morgan et al., "Optimal Program and Data Locations in Computer Networks", Published in Communications of the ACM, vol. 20(5):315-322, XP055281625, ISSN: 0001-0782, DOI: 10.1145/359581.359591, May 1, 1977 consisting of 8-pages.

Magnus Karlsson et al., "A Framework for Evaluating Replica Placement Algorithms", XP055281763, doi=10.1.3.3393, Dec. 31, 2002 consisting of 12-pages.

Xueyan Tang et al, "QoS-Aware Replica Placement for Content Distribution", Published in: IEEE Transactions on Parallel and Distributed Systems, vol. 16(10):921-932, ISSN: 1045-9219, INSPEC Accession No. 8611881, DOI: 10.1109/TPDS.2005.126, Publication Date: Oct. 2005 consisting of 12-pages.

* cited by examiner

Figure 8

DISTRIBUTED DATABASE

FIELD OF THE INVENTION

This invention relates to a method of operating a distributed database and corresponding apparatus. More particularly, the invention relates to a method of operating a distributed database that optimises the distribution of data among the nodes of the distributed database.

BACKGROUND TO THE INVENTION

Figure 1:
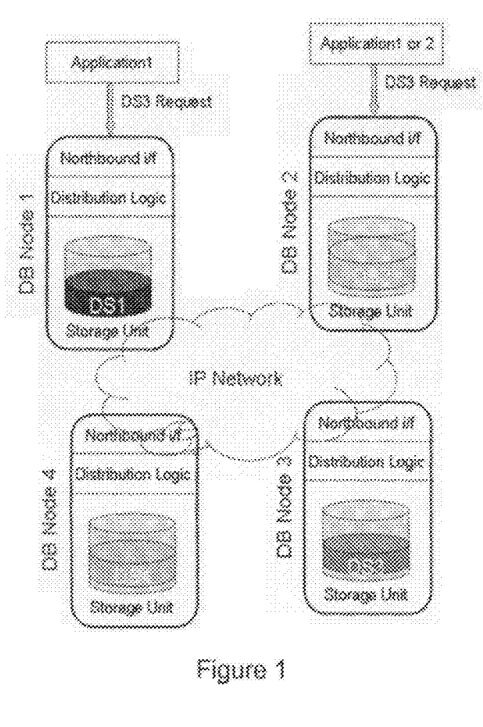
FIG. 1 illustrates schematically an example of a distributed database system.

A distributed database is a database in which the data is not stored at a single physical location. Instead, it is spread across a network of database nodes that are geographically dispersed and connected via communications links. FIG. 1 illustrates schematically an example of a distributed database system providing data access to a database client. The distributed database is comprised of a number of database (DB) nodes, with each database node being comprised of an interface, distribution logic, a storage unit, and a network connection. The interface (e.g. a northbound interface) receives requests from one or more apparatuses, referred to as "clients" of the distributed database, that use the data held by the database to execute one or more applications. Such an interface typically makes use of a data access protocol, such as the Lightweight Directory Access Protocol (LDAP). The requests received from the database client are commonly referred to as "data queries". For example, a database node may receive a query that requires retrieval (i.e. reading) of an item of data that is already stored by the distributed database (e.g. location information relating to a particular user of a telecommunications system). Alternatively, a database node may receive a query that requires storage (i.e. writing) of a new item of data into the database, as this data has not previously been stored by the distributed database. As a further example, a database node may receive a query that requires that an item of data that is already stored by the distributed database is overwritten by or updated with new data (e.g. storing updated location information of a user).

The distribution logic provides access to the data distributed among the plurality of database nodes that make up the distributed database. Typically, the distribution logic will function in a transparent manner such that a client perceives the distributed database to be a single logical database. A database client therefore does not need to know where any particular item of data is stored, since the distribution logic of the distributed database enables this complexity to be hidden from the client. Accordingly, a database client is usually configured to route any data queries towards one of the database nodes that acts as a so-called 'single point of access' for that client. A database client could also be configured to contact an alternative, back-up database node, should any attempt to contact the first database node fail. In FIG. 1, each of the database nodes are illustrated as including their own distribution logic unit. For example, this distribution logic unit could comprise a simple data table stored therein that enables the database node to determine which database node stores (or is intended to store) a specific item of data. However, this distribution logic can also be implemented in other ways. For example, as an alternative, the distribution logic could be implemented in a central node, such that each database node will be required to contact the central node in order to locate a specific item of data.

A database node that receives a request or query uses the distribution logic to determine whether or not it stores the data or, if the query requires that some data be written into the database, whether or not it is intended to store the data. If it does not store or is not intended to store the data, the distribution logic will then determine which of the other database nodes it should forward the query to. For example, the distribution logic may be able to determine exactly which of the other database nodes stores or should store the data that is the subject of the query, and will therefore ensure that the query is forwarded towards this database node. Alternatively, the distribution logic may not be able to determine exactly which of the other database nodes stores or should store the data, but may merely be able to determine which other database node it can forward the received query to in order to ensure that the query is routed towards the database node that stores or should store the data. For example, the distribution logic may be able to identify one of the other database nodes that is 'closer' to the database node which stores or should store that data. If a data request relates to an entirely new item of data that has not previously been stored in the database, then the distribution logic can use one of a number of different methods to determine which of the database nodes should store this data. For example, a hash of the data can be calculated and used as an index for identifying the database node that stores or is intended to store the data. Alternatively, the database node that is to store this new data can be selected according to the available storage capacity of each of the database nodes, the geographical position of each of the database nodes with respect to the client that generating the request etc.

The storage unit (or memory) stores the data that is the responsibility of that particular database node. The portion of the data that is stored at an individual database node is referred to as the database nodes data set (DS). For example, in FIG. 1 DB Node 1 stores DS1, DB Node 2 stores DS2, DB Node 3 stores DS3, and DB Node 4 stores DS4. It is common for a distributed database solution to divide the data to be stored into a number of "partitions", with the data falling within a particular partition being assigned to a data set stored at a particular database node. For example, a partition may comprise user data relating to a certain range of user identifiers, such as ranges of MSISDN numbers. In addition, some or all of the partitions can be replicated in one or more database nodes for security and/or availability purposes. For example, the data stored by DB Node 3 (DS3) can comprise, among other data, user data from within a first data partition that comprises MSISDN numbers from 2000000 to 3999999. The data stored by DB Node 4 (DS4) can comprise, among other data, user data from within a second data partition that comprises MSISDN numbers from 4000000 to 5999999. However, DS3 can further comprise a replicated copy of some or all of the data stored as a master copy by DB node 4 (i.e. DS4).

A database client can be, for example, an application server, a user terminal, or any other kind of apparatus that implements applications that are arranged to send requests/queries to the database to obtain and/or manipulate data. Generally, the database clients will implement applications that use the data stored by the distributed database to provide some specific services. For example, a first database client can implement a HLR or HSS application for providing 2G or 3G home registration services for users subscribed to a certain mobile telecom operator, whilst a second database client can implement an application that provides positioning-based services for some of these users. Accordingly, both of these applications may need to access data relating to the same users, which can be stored at one or more of the database nodes of a distributed database.

As the entirety of the data stored by a distributed database is distributed across the system, not all of the data is held by every database node, even if a degree of replication is implemented. As such, this will often mean that a data request that is sent to a first database node will relate to data that is not stored or is not intended to be stored at that database node. The data request must therefore be forwarded to a second database node within the distributed database system that holds either the master copy or a replicated copy of that data. The database node that first receives a request from a database client (i.e. as the client's point of access to the database) is referred to as the local database node, whilst the other database nodes within the distributed database are referred to as remote database nodes. Depending on where (i.e. at which remote database node) the data is stored or is intended to be stored, the time taken to handle the data request can vary, due mainly to the inherent transmission delays of the network that increase as the distance between the database nodes increases. Such access latency is typically around 1 ms per 100 km, but can change substantially subject to network conditions and/or network reconfigurations.

Figure 2:
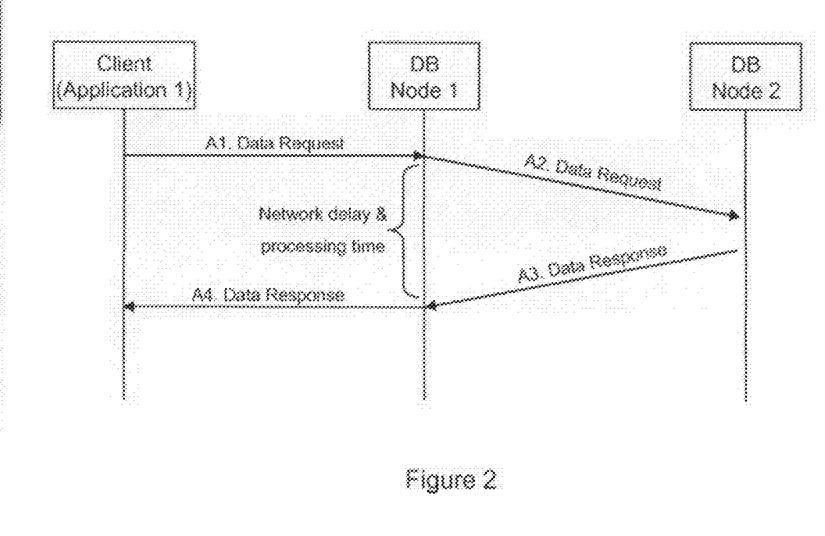
FIG. 2 is an example signalling flow diagram of a database client accessing data stored in a remote database node of a distributed database.

FIG. 2 is an example signalling flow diagram of a database client accessing data stored in a remote database node of a distributed database. The steps performed are as follows:

A1. A client sends a request relating to some data to the distributed database. To do so, the client is configured with the identity/address of one of the plurality of database nodes that is to act as a point of contact for the client. In this example, the client sends the query to its local database node, DB Node 1.

A2. The distribution logic of DB Node 1 processes the request to determine whether or not it stores or is intended to store that data to which the request relates. In this example, DB Node 1 determines that the request relates to data that is stored or is intended to be stored at a remote database node, DB Node 2, and forwards the request on to the DB Node 2.

A3. The distribution logic of DB Node 2 processes the request, determines that the data is stored or is intended to be stored in the storage unit of DB Node 2. DB Node 2 therefore attempts to complete the requested action, generates a response to the data request, and sends the response back to DB Node 1.

A4. DB Node 1 receives the response from DB Node 2, and forwards the response on to the client.

The delay/latency experienced by the client prior to receiving the response to the request will depend upon the distance between the database nodes, the internal processing time of each of the database nodes, the network bandwidth and any other limitations of the connections between the database nodes.

The additional latency introduced through the use of a distributed database is undesirable. In particular, the latency requirements, with regard to the time that elapses between the sending of a query from a database client and the reception by the client of the corresponding reply, can vary substantially from one application to another. For example, the latency requirements of a database client that provides a HLR or HSS application can be stricter (e.g. require shorter response times) than those required by database clients that provide positioning-based services. It is therefore preferable that a distributed database be arranged such that it can meet the latency requirements of all of the applications that it is required to serve.

One approach that attempts to ensure that a distributed database can meet all latency requirements can comprise distributing the data among the nodes of the database according to the latencies required by each database client/application, and configuring each database client/application to communicate with certain database nodes accordingly. However, maintaining this configuration can be extremely difficult when more database nodes are added to the distributed database, when a database node is replaced by a new one with different performance characteristics, and/or when new database clients/applications are deployed. Furthermore, the performance of any of the plurality of database nodes can change over time.

An alternative approach can be envisaged in which items of data stored within the distributed database are moved to the database node that last received a request relating to that data. For example, following initial configuration DB Node 1 may store a particular item of data. When DB Node 2 then receives a request relating to this data, such that the request has to be forwarded to DB Node 1 in order to be completed, the data is moved to DB Node 2. Whilst such an approach may temporarily minimise the latency for requests relating to this data that are subsequently sent to the same database node, by providing that this data is now stored "locally", they do not solve the problem of how to ensure that the database can meet the latency requirements of all applications, as these applications can be implemented at database clients that are not served by this database node. For example, an application at another database client may send a request relating to this data to DB Node 3, which will then result in the data being moved from DB Node 2 to DB Node 3. A subsequent data request relating to this data that is sent to DB Node 2 will then result in the data being moved back from DB Node 3 to DB Node 2. This could result in continuous or near-continuous redistribution of data between the database nodes, generating large amounts of traffic between the database nodes and only occasionally meeting the latency requirements of the applications implemented at database clients.

SUMMARY

It is an aim of the present invention to overcome, or at least mitigate, the above-mentioned problems.

According to a first aspect of the present invention there is provided a method of operating a distributed database comprising a plurality of database nodes each storing a set of data. The method comprises:

(a) receiving information on the average latencies measured for communications between each of the database nodes;

(b) measuring a latency that occurs when a database node of the plurality of database nodes contacts a further database node in order to respond to one or more data requests, received from one or more database clients, that relate to a subset of data that is one of stored and intended to stored at the further database node;

(c) comparing a measured latency to a latency threshold to determine if the latency threshold has been exceeded;

(d) if the latency threshold has been exceeded, comparing the latency threshold with the average latency measured for communications between each of the database nodes and determining if the latency for handling subsequent data requests relating to the subset of data could be reduced to below the latency threshold by storing the subset of data at an alternative database node other than the further database node; and (e) if so, storing at least the subset of data at the alternative database node.

This method provides that the latency experienced when a data request relates to data that is one of stored and intended to be stored within a distributed database can be kept within any applicable thresholds, taking into account dynamic changes in the conditions within the network that connects the nodes of the distributed database, and thereby dynamically optimising the data distribution.

Steps (b) to (d) may be performed at the database node. Alternatively, step (b) may be performed at the database node; the database node may then report the measured latency to a further node of the distributed database, and at least steps (c) to (d) may then be performed at the further node.

Step (d) may further comprise determining if the average latency measured for communication between the database node and the alternative database node does not exceed any latency thresholds that are applicable to the subset of data. method may further comprise:

identifying any further latency thresholds that are applicable to the subset of data;

identifying any of the plurality of database nodes that may handle data requests that relate to the subset of data; and for each of the plurality of database nodes other than the further database node, determining if an average latency measured for communication between the database node and each of the identified database nodes exceeds one of the latency threshold and any of the further latency thresholds.

The measured latency may be the latency measured for the most recent data request handled by the database node for which the subset of data is one of stored and intended to be stored at a further database node. Alternatively, the measured latency may be an average of latencies measured for a plurality of data requests handled by the database node for which the subset of data is one of stored and intended to be stored at a further database node.

The step of comparing a measured latency to a latency threshold to determine if the latency threshold has been exceeded may comprises comparing the measured latency to a latency threshold value, and determining that the latency threshold has been exceeded if the measured latency exceeds the latency threshold value for a data request handled by the database node for which the subset of data is one of stored and intended to be stored at a further data base node. Alternatively, this step may comprise comparing the measured latency to a latency threshold value, and determining that the latency threshold has been exceeded if the latency threshold value has been exceeded for one of a pre-defined minimum number and pre-defined minimum proportion of the data requests handled by the database node for which the subset of data is one of stored and intended to be stored at a further database node.

Step (c) may further comprise determining the latency threshold in dependence upon one or more of:

(i) the data request type;
(ii) a database client that sent the data request;
(iii) an application that generated the data request;
(iv) the subset of data to which the data request relates;
(v) a value included within the subset of data; and
(vi) a type of value included within the subset of data.

According to a second aspect of the present invention there is provided a method of operating an apparatus to provide a data distribution optimization function within a distributed database, the distributed database comprising a plurality of database nodes each storing a set of data. The method comprises:

(a) receiving information on the average latencies measured for communications between each of the database nodes;

(b) receiving a measured latency from a database node of the plurality of database nodes, the measured latency being indicative of a latency that occurs when the database node contacts a further database node in order to respond to one or more data requests that relate to a subset of data that is one of stored and intended to stored at the further database node; and (ci) comparing the measured latency to a latency threshold to determine if the latency threshold has been exceeded;

(cii) if the latency threshold has been exceeded, comparing the latency threshold with the average latency measured for communication between each of the database nodes and determining if the latency for handling subsequent data requests relating to the subset of data could be reduced to below the latency threshold by storing the subset of data at an alternative database node other than the further database node, wherein an alternative database node is any of the plurality of database nodes other than the further database may handle data requests relating to the subset of data; and (ciii) if so, causing at least the subset of data to be stored at the alternative database node.

The data distribution optimization function may be implemented at the database node. Alternatively, the data distribution optimization function may be implemented at a further node of the distributed database.

The data distribution optimization function may further comprise determining if the average latency measured for communication between the database node and the alternative database node does not exceed any latency thresholds that are applicable to the subset of data. method may further comprise:

identifying any further latency thresholds that are applicable to the subset of data;

identifying any of the plurality of database nodes that may handle data requests that relate to the subset of data; and for each of the plurality of database nodes other than the further database node, determining if an average latency measured for communication between the database node and each of the identified database nodes exceeds one of the latency threshold and any of the further latency thresholds.

A measured latency is compared to a latency threshold to determine if the latency threshold has been exceeded may comprise comparing the measured latency to a latency threshold value, and a determination is made that the latency threshold has been exceeded if the measured latency exceeds the latency threshold value for a data request handled by the database node for which the subset of data is one of stored and intended to be stored at a further database node. Alternatively, the measured latency is compared to a latency threshold value, and a determination is made that the latency threshold has been exceeded if the latency threshold value has been exceeded for one of a pre-defined minimum number and pre-defined minimum proportion of the data requests handled by the database node for which the subset of data is one of stored and intended to be stored at a further database node.

Step (ci) may further comprise determining the latency threshold in dependence upon one or more of:
(i) the data request type;
(ii) a database client that sent the data request;
(iii) an application that generated the data request;
(iv) the subset of data to which the data request relates;
(v) a value included within the subset of data; and
(vi) a type of value included within the subset of data.

According to a third aspect of the present invention there is provided a method of operating a database node of a distributed database, the distributed database comprising a plurality of database nodes each storing a set of data. The method comprises:
  measuring a latency that occurs when the database node contacts a further database node in order to respond to one or more data requests that relate to a subset of data that is one of stored and intended to be stored at the further database node;
  calculating an average latency value for its communications with each of the database nodes in the distributed database;
  sending notifications reporting the average latency values to data distribution optimization functions in the distributed database; and
  reporting a latency measure to a further node of the distributed database.

The latency measure may be the latency measured for the most recent data request handled by the database node for which the subset of data is one of stored and intended to be stored at a further database node. Alternatively, the latency measure may be an average of latencies measured for a plurality of data requests handled by the database node for which the subset of data is one of stored and intended to be stored at a further database node.

The method may further comprise:
  receiving data requests from database clients;
  for each data request:
    determining if the data is one of stored and intended to be stored at the database node; and
    if the data is one of not stored and not intended to be stored at the database node, forwarding the data request towards a further database node of the plurality of database nodes.

According to a fourth aspect of the present invention there is provided an apparatus configured to provide a data distribution optimization function within a distributed database, the distributed database comprising a plurality of database nodes each storing a set of data. The apparatus comprises:
  a receiver configured to receive information on the average latencies measured for communications between each of the database nodes and a measured latency from a database node of the plurality of database nodes, the measured latency being indicative of a latency that occurs when the database node contacts a further database node in order to respond to one or more data requests that relate to a subset of data that is one of stored and intended to stored at the further database node;
  an analysis unit configured to:
    compare the measured latency to a latency threshold to determine if the latency threshold has been exceeded;
    if the latency threshold has been exceeded, compare the latency threshold with the average latency measured for communication between each of the database nodes and determine if the latency for handling subsequent data requests relating to the subset of data could be reduced to below the latency threshold by storing the subset of data at an alternative database node other than the further database node the alternative database node is any of the plurality of database nodes other than the further database node that may handle data requests relating to the subset of data; and
  a data redistribution unit for causing at least the subset of data to be stored at the alternative database node.

The analysis unit may be further configured to determining if the average latency measured for communication between the database node and the alternative database node does not exceed any latency thresholds that are applicable to the subset of data. The analysis unit may be further configured to:
  identify any further latency thresholds that are applicable to the subset of data;
  identify any of the plurality of database nodes that may handle data requests that relate to the subset of data; and
  for each of the plurality of database nodes other than the further database node, determine if an average latency measured for communication between the database node and each of the identified database nodes exceeds one of the latency threshold and any of the further latency thresholds.

The analysis unit may be further configured to compare the measured latency to a latency threshold value, and determine that the latency threshold has been exceeded if the measured latency exceeds the latency threshold value for a data request handled by the database node for which the subset of data is one of stored and intended to be stored at a further database node. Alternatively, the analysis unit may be further configured to compare the measured latency to a latency threshold value, and determine that the latency threshold has been exceeded if the latency threshold value has been exceeded for one of a pre-defined minimum number and pre-defined minimum proportion of the data requests handled by the database node for which the subset of data is one of stored and intended to be stored at a further database node.

The analysis unit may be further configured to determine the latency threshold in dependence upon one or more of:
(i) the data request type;
(ii) a database client that sent the data request;
(iii) an application that generated the data request;
(iv) the subset of data to which the data request relates;
(iv) a value included within the subset of data; and
(v) a type of value included within the subset of data.

According to a fifth aspect of the present invention there is provided an apparatus configured to operate as a database node of a distributed database, the distributed database comprising a plurality of database nodes each storing a set of data. The apparatus comprises:
  a measurement unit configured to measure a latency that occurs when the database node contacts a further database node in order to respond to one or more data requests that relate to a subset of data that is one of stored and intended to stored at the further database node, the measurement unit being further configured to calculate an average latency value for its communications with each of the database nodes in the distributed database and to generate notifications for reporting the average latency values to data distribution optimization functions in the distributed database; and a transmitter configured to report a latency measure to a further node of the distributed database and for transmitting said notifications to the data distribution optimization functions.

The measurement unit may be further configured to calculate the latency measure as the latency measured for the most recent data request handled by the database node for which the subset of data is one of stored and intended to be stored at a further database node. Alternatively, the measurement unit may be further configured to calculate the latency measure as an average of latencies measured for a plurality of data requests handled by the database node for which the subset of data is one of stored and intended to be stored at a further database node.

The apparatus may further comprise:
a receiver configured to receive, from a database client, a data request relating to a subset of data;
a request processing unit configured to determine if the subset of data is one of stored and intended to be stored at the database node; and
a transmitter for forwarding the data request towards a further database node of the plurality of database nodes if the subset of data is one of not stored and not intended to be stored at the database node.

BRIEF DESCRIPTION OF THE DRAWINGS

Some embodiments of the present invention will now be described in detail with reference to the accompanying drawings, in which.

DETAILED DESCRIPTION OF CERTAIN EMBODIMENTS

There will now be described a method of operating a distributed database to dynamically redistribute the data stored in the database between the database nodes, and thereby ensure that the database can meet the latency requirements of all of the database clients/applications that it is required to serve. The method involves measuring the latency (delay) that occurs at a database node when the database node contacts a further database node in order to respond to one or more data requests that relate to data that is stored or is intended to stored at the further database node, and comparing a measured latency to a latency threshold to determine if the latency threshold has been exceeded, and therefore determine if the latency is unacceptable. If it is determined that the latency threshold has been exceeded, then it is determined whether or not storing the subset of data at an alternative database node other than the further database node could ensure that a subsequently measured latency does not exceed the latency threshold. If so, then the data is stored at the alternative database node.

In order to implement this method, a distributed database is provided with one or more Data Distribution Optimisation (DDO) functions. A DDO function makes use of measurements of the latencies that occur for communications between database nodes, and the latency requirements applicable to the data that is the subject of a request, in order to determine which of the database nodes should store the data. If the DDO function determines that some data should be stored at a database node other than that which currently stores the data, then the DDO function will initiate redistribution/reallocation of the data to the other database node. In doing so, the DDO function ensures that the data is stored at a database node that can meet any latency requirements that may be applicable to that data.

The DDO function can be provided in each of the database nodes of the distributed database, such that each database node will determine if any of the data that it currently stores should be redistributed to another database node, and initiate any redistribution accordingly. Alternatively, the DDO function can be provided in a portion of the database nodes, or in one or more further nodes within the distributed database (e.g. such as a centralised database management node). In this case, a DDO function would then receive measured latency information from the database nodes, determine if any of the data should be redistributed among the database nodes, and initiate any redistribution of data accordingly.

Figure 3:
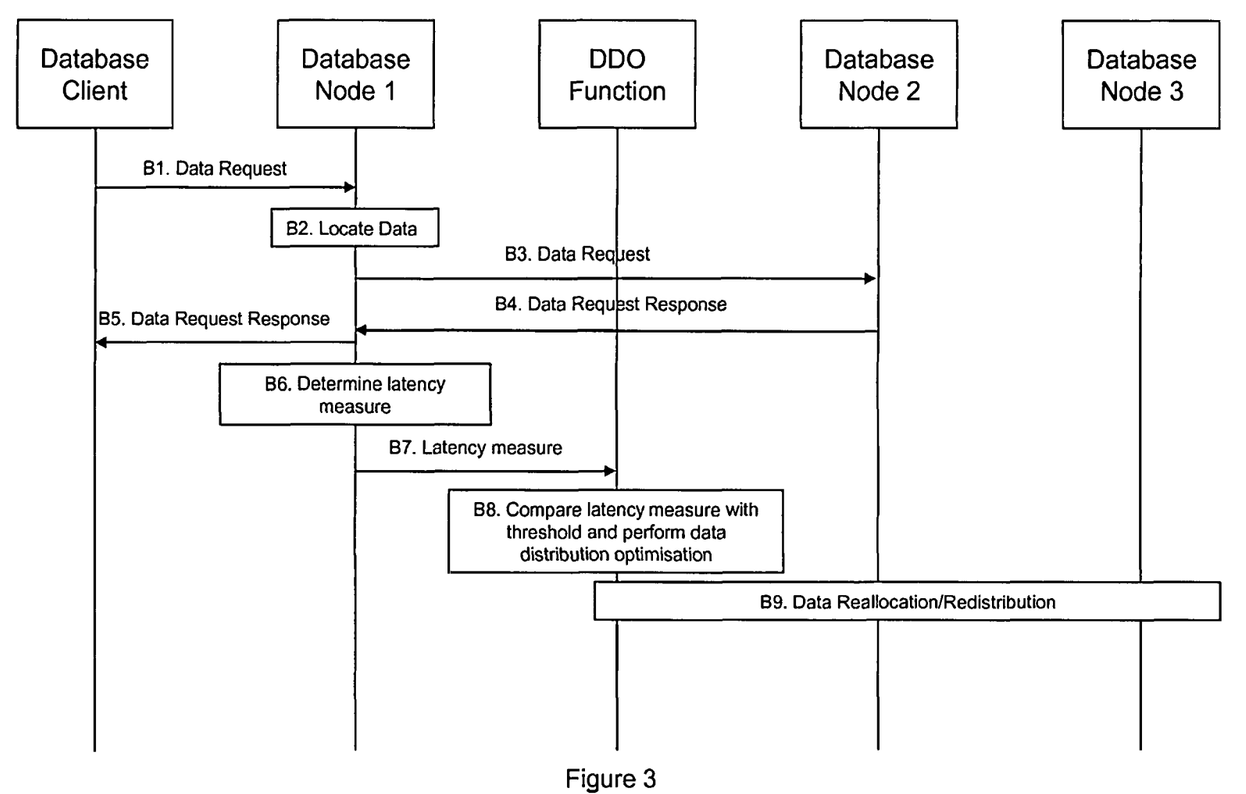
FIG. 3 is a signalling flow diagram illustrating an example of a process implemented by a distributed database in response to a data request from a database client.

FIG. 3 is a signalling flow diagram illustrating an example of the process implemented by a distributed database in response to a data request from a database client. The steps performed are as follows:

B1. An application implemented at a database client generates a data request/query relating to some data to its local database node, Database Node 1.

B2. When the database node receives the data request/query from the database client, the database node determines if the data is stored or is intended to be stored (i.e. if it relates to the writing of data) locally at the database node.

B3. If it is determined that the data is not stored or is not intended to be stored at the database node, and therefore that the data is stored or is intended to be stored remotely, then the database node forwards the request/query towards a further database node that, according to the distribution logic, stores or is intended to store that data. In this example, Database Node 1 determines that it does not store or it is not intended to store the data to which the data request relates, and that this data is stored or intended to be stored at a second database node, Database Node 2. Database Node 1 therefore forwards the request towards Database Node 2.

B4. The database node receives a response to the data request from the further database node.

B5. The data request response is forwarded on to the database client.

B6. The database node then determines a latency measure that is indicative of the latency that occurs when handling data requests/queries relating to this data. This latency measure may simply be the latency measured in relation to this latest request/query, or may be a representative latency value derived from the measured latency. For example, a representative latency value may be the average latency for data requests/queries relating to this data calculated over a specific period or number of data requests/queries. Alternatively, the representative latency value may be the average latency for any communications with the database node that stores or is intended to store the data, calculated over a specific period or number of data requests/queries.

B7. The database node provides the latency measure to a DDO function. This DDO function may be implemented within/collocated with the database node itself, or may implemented within/collocated with another database node or a further node, as described above.

B8. The DDO function then compares the latency measure with a pre-defined latency threshold in order to determine if this latency threshold has been exceeded. For example, a different latency threshold can be configured for each application that can request data (e.g. the threshold will vary depending upon the application that is requesting data). In this case, the DDO function will identify/determine which application generated the request and compare the latency measure with a latency threshold associated with that application. For example, the application could be identified based on information included in the data request, such as the IP address, port, etc. The corresponding latency threshold could then be determined by performing a lookup in a database that includes application latency thresholds. Such a database could be preconfigured in the DDO function. If the latency threshold has been exceeded, then the DDO function performs a data distribution optimisation process. This process involves determining if the latency for handling subsequent data requests relating to this data could be reduced to below the threshold by storing this data at an alternative database node (i.e. other than that which currently stores the data), provided that this will not increase the latency experienced by any other applications that require access to this data to above any corresponding threshold applicable to this data. In this example, the DDO function determines that the data should be stored at Database Node 3, as opposed to Database Node 2.

B9. If it is determined that reallocation/redistribution of the data would optimise the latency that occurs when handling subsequent data requests relating to this data, then the DDO function initiates reallocation/redistribution of the data from the further database node to an alternative database node accordingly. In this example, the DDO function initiates reallocation/redistribution from Database Node 2 to Database Node 3.

The latency threshold can simply be a latency threshold value (i.e. time), such that the latency threshold is exceeded if the latency measure exceeds the latency threshold value. Alternatively, the latency threshold can define a latency threshold value, but can require that a latency measure must exceed this latency threshold value on a number of occasions before the latency threshold is exceeded. For example, in order for a latency threshold to be exceeded, it may be required that a pre-defined latency threshold value is exceeded for a pre-defined minimum number or minimum proportion of the data requests that relate to a particular item of data. This would prevent a brief increase in the measured latency from causing data to be reallocated.

In order to determine a latency measure, a database node measures the latency (delay) experienced when handling data requests for which the data is stored at a remote database node. This latency can be:
(a) the time that elapses between receipt of the initial data request at the database node from the database client, and the sending of a corresponding response to the database client by the database node;
(b) the time that elapses between the forwarding of the request to the remote database node that stores or is intended to store that data and the receipt of a response from the remote database node (i.e. the round trip time for the communication between the local database node and the remote database node); or
(c) the time that elapses between the forwarding of the request to the remote database node and the sending of a corresponding response to the database client.

For example, the latency can be measured by starting a timer upon receipt of a data request, and stopping the timer when a response is sent. Alternatively, this may involve starting a timer when a data request is forwarded to a further database node, and stopping the timer when a response is received from the further database node, to measure the round trip time. In addition, if a timer is used solely to measure the round trip time of the communication with the remote database node, then the local database node could add a value for the time taken to perform local processing of the request to the time measured using the timer. As a further alternative, the latency could be measured by inserting time stamps into a processing log or into the messages exchanged between the database nodes.

Furthermore, in order to determine if the latency that is likely to occur for subsequent data requests relating to this data can be reduced to below any applicable threshold, the DDO function compares these thresholds to the average latency measured for communication between each of the database nodes. In order to do so, the DDO function regularly receives information on the average latencies measured for communications between each of the database nodes. For example, as described above, each database node will measure these latencies when handling data requests for which data is stored at another of the database nodes, and can therefore store and maintain an average latency value for its communications with the other database nodes. Each database node can then provide this average latency information to each of the DDO functions.

Figure 4:
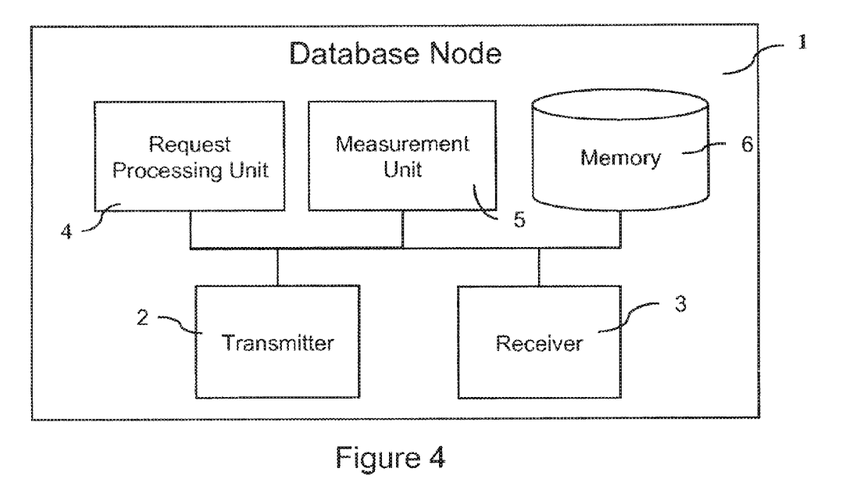
FIG. 4 illustrates schematically an embodiment of a database node.

FIG. 4 illustrates schematically an embodiment of a database node 1 configured to perform the methods described above. The database node 1 can be implemented as a combination of computer hardware and software and comprises a transmitter 2, a receiver 3, a request processing unit 4, a measurement unit 5, and a memory 6. The request processing unit 4 and the measurement unit 5 may be provided by programs/executable files that are stored in the memory 6 and implemented by a processor. The memory 6 stores that portion of the data (i.e. the data set) that is assigned/allocated to the database node together with any additional data or information that is required by the database node.

Figure 5:
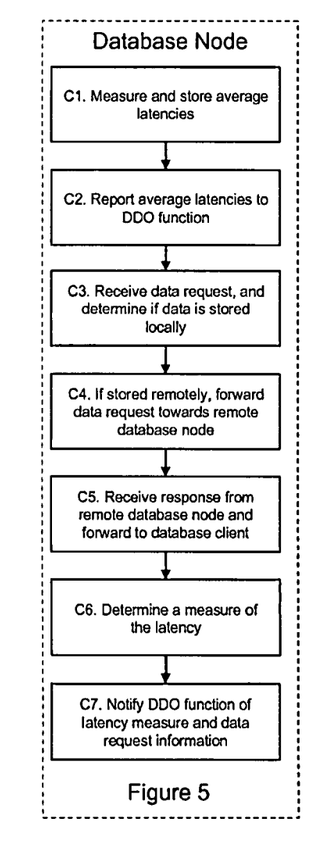
FIG. 5 is a flow diagram illustrating an example of the process implemented by a database node.

FIG. 5 is a flow diagram illustrating an example of the process implemented by a database node. The steps performed are as follows:
C1. The measurement unit 5 measures the latency occurs when the database node contacts remote database nodes in order to respond to data requests that relate to data that is stored or is intended to stored at the remote database nodes. The measurement unit 5 can use these measurements to calculate/maintain an average latency value for its communications with each of the remote database nodes. The measurement unit 5 can store these average latency values in the memory 6.

C2. The measurement unit 5 generates messages/notifications that are sent to each of the DDO functions within the distributed database, using the transmitter 2, to report the average latency values. For example, the database node may send an update of its average latency values after a predefined time period has expired, or a predefined minimum number of communications have taken place with the other database nodes. Alternatively, the database node may send updates whenever there is a significant change in any of the average latency values.

C3. When the database node receives a data request/query from a database client, via the receiver 3, the request processing unit 4 uses the distribution logic, which is stored in the memory 6, to determine if the data is stored or is intended to be stored locally at the database node 1.

C4. If it is determined that the data is not stored or is not intended to be stored at the database node 1, and therefore that the data is stored or is intended to be stored remotely, then the request processing unit 4 causes the request/query to be forwarded, using the transmitter 2, towards a further database node that stores or is intended to store that data.

C5. The database node 1 then receives a response to the data request from the further database node via the receiver 3, and the request processing unit 4 causes the response to be forwarded to the database client using the transmitter 2.

C6. The measurement unit 5 also measures the latency that occurs when handling the data request and determines a measure of the latency. For example, this latency measure may be the latency value measured in relation to this latest request/query, or may be a representative latency calculated over a specific period or number of requests/queries.

C7. The measurement unit 5 then generates a message notifying a DDO function of the latency measure and includes information regarding the data request to which the latency measure relates. For example, the database node may notify a DDO function implemented within/collocated with the database node itself, or may notify a DDO function implemented within/collocated with another database node or a further node. This message is sent to the DDO function using the transmitter 2.

Figure 6:
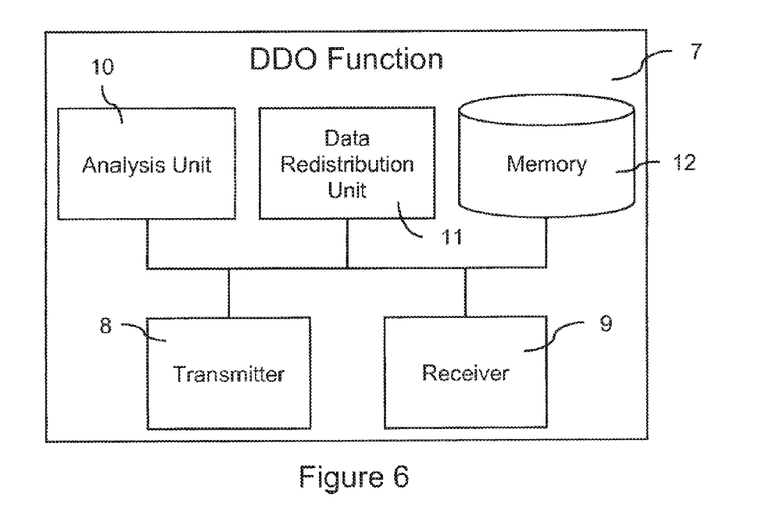
FIG. 6 illustrates schematically an embodiment of a Data Distribution Optimisation function.

FIG. 6 illustrates schematically an embodiment of a DDO function 7 configured to perform the methods described above. The DDO function 7 can be implemented as a combination of computer hardware and software and comprises a transmitter 8, a receiver 9, an analysis unit 10, a data redistribution unit 11, and a memory 12. The analysis unit 10 and the data redistribution unit 11 may be provided by programs/executable files that are stored in the memory 12 and implemented by a processor. The memory 12 stores any configuration information that is pre-configured into the DDO function 7 together with any additional data or information that is required by the DDO function.

Figure 7A:
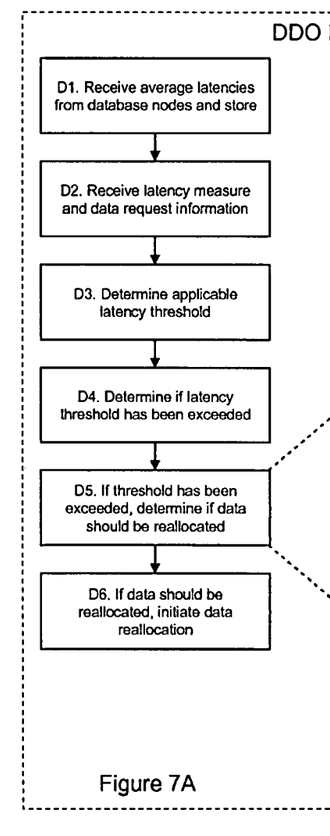
FIG. 7A is a flow diagram illustrating an example of the process implemented by a Data Distribution Optimisation function.

FIG. 7A is a flow diagram illustrating an example of the process implemented by a Data Distribution Optimisation (DDO) function 7. The steps performed are as follows:

D1. The DDO function 7 receives, using the receiver 9, reports from each of the database nodes including the average latency values for their communications with each of the other database nodes. These average latency values are stored in the memory 12.

D2. The DDO function 7 receives, using the receiver 9, a notification message from a database node. For example, the DDO function 7 may receive the message from a database node with which it is collocated, or from a separate database node. The notification message includes a latency measure together with information regarding the data request to which the latency measure relates. By way of example, the information regarding the data request to which the latency measure relates can comprise an identifier of the application that generated the request.

D3. The analysis unit 10 then identifies a latency threshold that is applicable to this data. For example, the analysis unit 10 could identify the application that generated the request based on information included in the data request, such as the IP address, port, etc, and configuration information stored in the memory 12. A corresponding latency threshold could then be determined by performing a lookup in a database stored in the memory 12 that identifies applications and their corresponding latency thresholds.

D4. The analysis unit 10 then compares the latency measure with the applicable latency threshold to determine if the threshold has been exceeded.

D5. If the threshold has been exceeded, then the analysis unit 10 performs a data distribution optimisation process to determine if the data should be reallocated/redistributed to an alternative database node other than the database node that currently stores the data. This data distribution optimisation process is described below with reference to FIG. 7B.

D6. If the analysis unit 10 determines that the data should be reallocated/redistributed, then the data redistribution unit 11 initiates the reallocation/redistribution of the data.

In order to initiate the reallocation/redistribution of data, the data redistribution unit 11 could send a request to either the origin database node (i.e. the database node that currently stores the data), the destination database node (i.e. the database node at which the data is to be stored), or to both the origin database node and the destination database node. For example, the data redistribution unit 11 could send a message to the destination database node requesting that the data be stored at the destination database node. The request could include an identifier for the data that is to be moved. Alternatively, the data that is to be stored could be included in the request itself, particularly if the DDO function is implemented at the database node that initially received the data request. If required, the data redistribution unit 11 could then notify the origin database node that the data is now stored elsewhere so that the data can be deleted from the origin database node.

Once reallocation/redistribution of the data has been successfully completed, then the distribution logic within each database node can be updated such that each database node can locate the data. For example, the destination database node could inform the DDO function of the successful completion of the data redistribution and the data redistribution unit could then notify the other database nodes to update their distribution logic. Alternatively, the destination database node could notify each of the other database nodes itself.

Figure 7B:
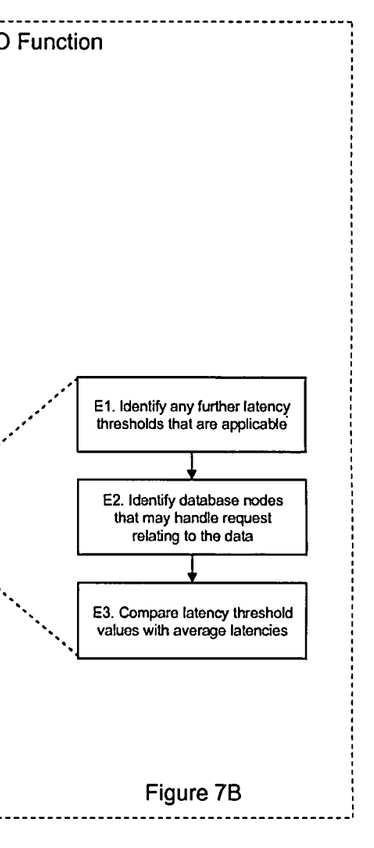
FIG. 7B is a flow diagram illustrating an example of the data distribution optimisation process implemented by a Data Distribution Optimisation function.

FIG. 7B is a flow diagram illustrating an example of the data distribution optimisation process implemented by a Data Distribution Optimisation (DDO) function. The steps performed are as follows:

E1. The analysis unit 10 identifies any further threshold latencies that may be applicable to this data. For example, the analysis unit 10 could identify any further applications that may generate requests relating to the data and any corresponding latency thresholds by performing a lookup in a database stored in the memory 12. Such a database could be preconfigured in the DDO function.

E2. The analysis unit 10 then identifies any of the plurality of database nodes that may handle data requests relating to this data. For example, the analysis unit 10 could identify any database nodes that implement the application that generated the request, and any database nodes that implement any further applications that may generate requests relating to this data, using configuration information stored in the memory 12.

E3. For each of the plurality of database nodes other than the further database node, the analysis unit 10 then compares the latency threshold values of the latency threshold and any further latency thresholds to the average latencies that have been measured for communications between the database node and each of the identified database nodes. This comparison may then identify a database node, other than the further database, whose average latencies indicate that storing the data at this database node would reduce the latencies experienced by the identified database nodes to below the latency threshold values that are applicable to this data.

As noted above, the DDO function can be provided with configuration information that enables it to perform the distribution optimisation process. This configuration information can be pre-configured into the DDO function. For example, this configuration information can include a database of latency thresholds that identifies a latency threshold for each application served by the distributed database, thereby enabling the DDO function to identify the latency threshold applicable to an application that generates a data request. In addition, the configuration information could include information that identifies the types of data that are accessed by each application, and a database identifying the applications that are served by each database node of the distributed database. This information would enable the DDO function to determine which other applications will require access to any data that may be moved, and which of the database nodes serve these applications.

Further, when the DDO function performs the distribution optimisation process to determine whether or not data should be reallocated to an alternative database node other than that which currently stores that data, the DDO function can consider either an individual item of data or the entire distribution cluster (DC) to which that individual item of data belongs. In this regard, a distribution cluster can include a number of items of data that should always be stored together. For example, in relational databases a DC can comprise all the data of a (relational) table, one or more rows of one or more tables, etc. By way of further example, for data that uses a hierarchical model, and is therefore organised in a tree-like structure, a distribution cluster can include attributes relating to one or more entries or a sub-tree of entries. Therefore, when the latency for accessing an individual item of data that belongs to a distribution cluster exceeds a latency threshold, the DDO function should consider reallocation of all of the data within the distribution cluster, and the thresholds applicable to all of the data within the cluster, when performing the data distribution optimisation process. If any of the data stored at a database node is part of one or more distribution clusters, then this will be configured in the database nodes distribution logic, such that the database nodes will ensure that this data is considered as a cluster when applying the data distribution optimisation process.

By way of example, when considering a distributed database that stores data relating to subscribers of a telecommunications system, a distribution cluster can be assumed to comprise all data relating to a particular subscriber of the system (e.g. identifiers, registration status and information, activation state for supplementary services, roaming restrictions, etc). All of the data within the distribution cluster relating to a subscriber should therefore be located within a single database node, and not distributed among various database nodes. Therefore, if a DDO function determines that the latency for accessing any of the data relating to a particular subscriber is unacceptable, then the DDO function should apply the distribution optimisation process to the distribution cluster, to determine if all of the data within the distribution cluster can be moved from one database node to another. Alternatively, a distribution cluster could comprise all of the data relating to a number of subscribers that is held at a particular database node, or only particular items of data relating to one or more subscribers (e.g. only the identifiers, registration status and/or positioning information relating to one or more subscribers). In cases wherein a distribution cluster is configured to include or all of the data relating to a number of subscribers, then the data making up a distribution cluster, and which will therefore be considered for reallocation, can be defined using data pointers, auxiliary data tables and/or metadata files.

Figure 8:
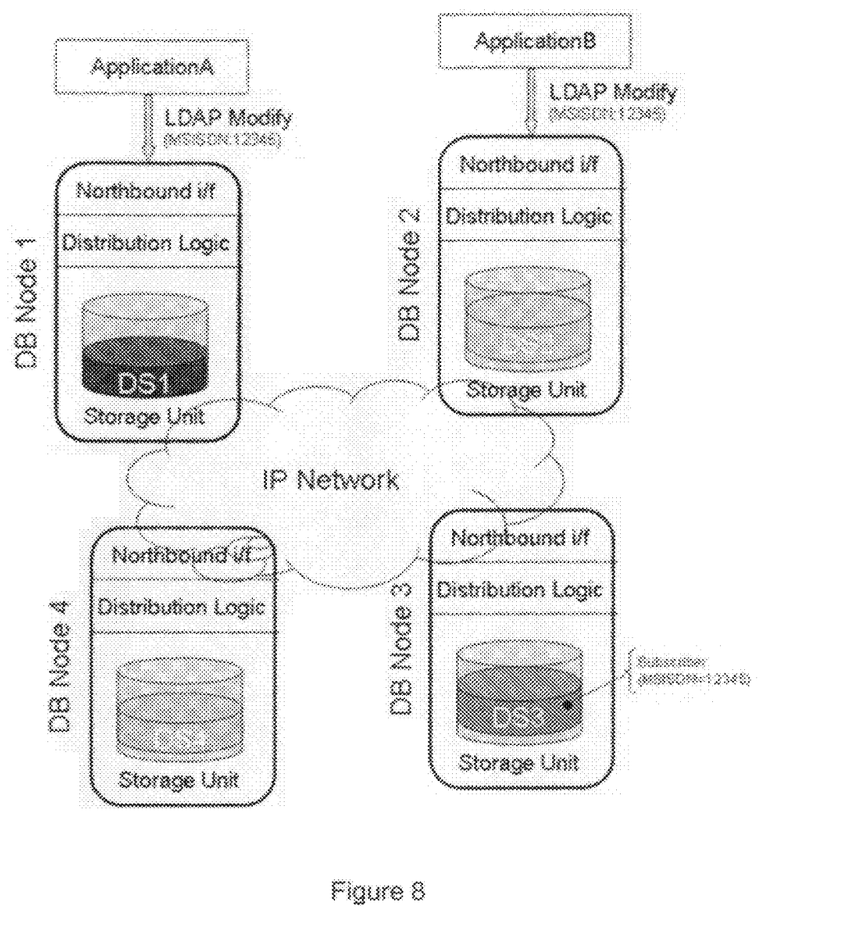
FIG. 8 illustrates schematically an example of the application of a distributed database system.

FIG. 8 illustrates a scenario in which the methods outlined above can be used. In FIG. 8, two applications, "Application A" and "Application B", can send data requests/queries to database nodes of a distributed database to request access to items of data that are part of the same distribution cluster relating to a user identified with the Mobile Station ISDN Number (MSISDN) "12345". The latency thresholds that are applicable to Application A and Application B are provided in the configuration information stored in DDO functions implemented at each of DB Node 1 and DB Node 2 and are defined as 13 ms and 17 ms respectively. In addition, the DDO functions at each of DB Node 1 and DB Node 2 have been provided with the average latencies measured by each database node for their communications with the other database nodes of the distributed database, which are given in the Table 1 below.

A database client hosting Application A sends a data request to its local database node, DB Node 1. DB node 1 makes use of its distribution logic to determine whether the data to which the request relates is stored locally at DB Node 1, or remotely at another database node. In this example scenario, the data is stored remotely at DB Node 3. DB Node 1 therefore forwards the data request to DB Node 3 and measures the latency that occurs. To do so, DB Node 1 can start a timer when the request is forwarded to DB Node 3, and stop the timer when the response if obtained back from the remote DB Node 3. As an alternative, DB Node 1 could use a measure of the average delay for a round trip communication with DB Node 3. DB Node 1 can then add on a value for its internal processing time to this measured round trip delay in order to obtain the overall latency since the initial request from the database client was received and a response returned to the database client. In this example, the latency measure for communication with DB Node 3 is determined to be 15 ms.

DB Node 1 will also use its distribution logic to determine whether or not the data to which the request relates is part of a distribution cluster and, if so, identify the appropriate distribution cluster and the other items of data within the cluster. In this scenario, the data request from Application A relates to a subscriber identified by MSISDN "123456" and the distribution cluster includes all data relating to that subscriber.

The latency measure is then provided to the DDO function implemented at DB Node 1, together with information relating to the data request and information relating to the identified distribution cluster. The DDO function uses the information relating to the data request to identify the application that generated the request, and to determine a latency threshold applicable to that application. This can be determined from the configuration information that is pre-configured into the DDO function. In this scenario, the DDO function therefore determines that Application A generated the request, and that the applicable threshold is 13 ms. The DDO function then compares the latency measure of 15 ms with this 13 ms threshold, and therefore determines that this latency is unacceptable and that it should redistribute this data if possible.

The DDO function then makes further use of its configuration information to identify other applications that may require access to the data that is within the identified distribution cluster, the latency thresholds applicable to these applications, and the database nodes that serve any of these applications. In this scenario, the DDO function determines that only Application A and Application B will access the identified distribution cluster, that the applicable latency thresholds are 13 ms and 17 ms respectively, and that these applications are served by DB Node 1 and DB Node 2 respectively. The DDO function then compares the average latency information, given in Table 1, with these thresholds in an attempt to identify a database node that fulfils the requirements of:

i) latency of less than 13 ms for communication with DB Node 1; and
ii) latency of less than 17 ms for communication with DB Node 2.

The DDO function therefore identifies DB Node 4 as the only database node that can provide latencies that are within the latency thresholds of the applications that require access the data in the distribution cluster, and initiates redistribution of this distribution cluster from DB Node 3 to DB Node 4.

As a result, any subsequent data requests from DB Node 1 that are generated by Application A and that relate to data within this distribution cluster will most likely be completed with a latency that is within the latency threshold for Application A, whilst data requests generated by other applications, such as Application B at DB Node 2, will also be completed within any corresponding threshold. The distribution of this data will therefore be optimised.

The methods and apparatus described above provide that the latency experienced by applications accessing data stored within a distributed database can be kept within any applicable thresholds, taking into account dynamic changes in the conditions within the network that connects the nodes of the distributed database, and thereby dynamically optimising the data distribution. They can also avoid the continuous or near-continuous redistribution of data between the database nodes, as would likely occur if data was always moved to the database node that last accessed the data. These methods and apparatus are also provide flexibility in managing the distribution of data between the database nodes, by enabling the latency measure used and the applicable latency thresholds to be defined in numerous ways. For example, the latency threshold applicable to a particular data request can be determined based on one or more of:

the type of data request (e.g. retrieve, modify, etc);
the identity of database client that sent the data request;
the application that generated the data request;
the data or distribution cluster to which the data request relates;
a value included within the data or distribution cluster; and
a type of value included within the data or distribution cluster.

These methods also provide a straightforward mechanism for introducing and removing database nodes from the distributed database, as merely updating the configuration information stored in the DDO functions will cause the database to redistribute the data accordingly. In addition, if a data request received by a database nodes relates to the writing of an entirely new item of data into the database (i.e. an item of data not previously stored in the database), then the DDO function can determine which database node should store the data based on the measured latencies and/or applicable latency threshold(s); thereby further enhancing the data distribution optimisation.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, if it is determined that a latency threshold applicable to an item of data has been exceeded, or it some data is redistributed, then the DDO function could also be responsible for ensuring that a log of such occurrences is updated or an alarm or notification is generated in order that those responsible for the distributed database are aware of any data distribution issues.

TABLE 1

|  |  | Remote Database Node | | | |
|---|---|---|---|---|---|
|  |  | DB Node 1 | DB Node 2 | DB Node 3 | DB Node 4 |
| Local Database Node | DB Node 1 | — | 18 | 20 | 5 |
|  | DB Node 2 | 19 | — | 10 | 15 |
|  | DB Node 3 | 21 | 10 | — | 10 |
|  | DB Node 4 | 5 | 15 | 9 | — |

The invention claimed is:

1. A method of operating a distributed database comprising a plurality of database nodes each storing a set of data, the method comprising:
(a) receiving information on average latencies measured for communications between each of the database nodes;
(b) measuring a latency that occurs when a database node of the plurality of database nodes contacts a further database node in order to respond to one or more data requests, received from one or more database clients, that relate to a subset of data that is one of stored and intended to be stored at the further database node;

(c) comparing the measured latency to a latency threshold to determine if the latency threshold has been exceeded;

(d) if the latency threshold has been exceeded, comparing the latency threshold with the average latency measured for communications between each of the database nodes and determining if a latency for handling subsequent data requests relating to the subset of data could be reduced to below the latency threshold by storing the subset of data at an alternative database node other than the database node and the further database node, the alternative database node being any of the plurality of database nodes other than the database node and the further database node that may handle data requests relating to the subset of data; and (e) if the latency for handling subsequent data requests relating to the subset of data could be reduced to below the latency threshold, storing at least the subset of data at the alternative database node.

2. The method of claim 1, wherein steps (b) to (d) are performed at the database node.

3. The method of claim 1, wherein step (b) is performed at the database node, the database node then reports the measured latency to a further node of the distributed database, and at least steps (c) to (d) are performed at the further node.

4. The method of claim 1, further comprising:
determining if the average latency measured for communication between the database node and the alternative database node does not exceed any latency thresholds that are applicable to the subset of data.

5. The method of claim 4, further comprising:
identifying any further latency thresholds that are applicable to the subset of data;
identifying any of the plurality of database nodes that may handle data requests that relate to the subset of data; and
for each of the plurality of database nodes other than the further database node, determining if an average latency measured for communication between the database node and each of the identified database nodes exceeds one of the latency threshold and any of the further latency thresholds.

6. The method of claim 1, wherein the measured latency is the latency measured for the most recent data request handled by the database node for which the subset of data is one of stored and intended to be stored at the further database node.

7. The method of claim 1, wherein the measured latency is an average of latencies measured for a plurality of data requests handled by the database node for which the subset of data is one of stored and intended to be stored at the further database node.

8. The method of claim 1, wherein the step of comparing a measured latency to a latency threshold to determine if the latency threshold has been exceeded comprises:
comparing the measured latency to a latency threshold value, and determining that the latency threshold has been exceeded if the measured latency exceeds the latency threshold value for a data request handled by the database node for which the subset of data is one of stored and intended to be stored at the further database node.

9. The method of claim 1, wherein the step of comparing a measured latency to a latency threshold to determine if the latency threshold has been exceeded comprises:
comparing the measured latency to a latency threshold value, and determining that the latency threshold has been exceeded if the latency threshold value has been exceeded for one of a pre-defined minimum number and pre-defined minimum proportion of the data requests handled by the database node for which the subset of data is one of stored and intended to be stored at the further database node.

10. The method of claim 1 further comprising determining the latency threshold in dependence upon one or more of:
(i) the data request type;
(ii) a database client that sent the data request;
(iii) an application that generated the data request;
(iv) the subset of data to which the data request relates;
(v) a value included within the subset of data; and
(vi) a type of value included within the subset of data.

11. A method of operating an apparatus to provide a data distribution optimization function within a distributed database, the distributed database comprising a plurality of database nodes each storing a set of data, the method comprising:

(a) receiving information on average latencies measured for communications between each of the database nodes;

(b) receiving a measured latency from a database node of the plurality of database nodes, the measured latency being indicative of a latency that occurs when the database node contacts a further database node in order to respond to one or more data requests that relate to a subset of data that is one of stored and intended to be stored at the further database node; and (c) performing the data distribution optimization function, comprising:
(ci) comparing the measured latency to a latency threshold to determine if the latency threshold has been exceeded;
(cii) if the latency threshold has been exceeded, comparing the latency threshold with the average latency measured for communication between each of the database nodes and determining if a latency for handling subsequent data requests relating to the subset of data could be reduced to below the latency threshold by storing the subset of data at an alternative database node other than the database node and the further database node, the alternative database node being any of the plurality of database nodes other than the database node and the further database node that may handle data requests relating to the subset of data; and
(ciii) if the latency for handling subsequent data requests relating to the subset of data could be reduced to below the latency threshold, causing at least the subset of data to be stored at the alternative database node.

12. The method of claim 11, wherein the data distribution optimization function is implemented at the database node.

13. The method of claim 11, wherein the data distribution optimization function is implemented at a further node of the distributed database.

14. The method of claim 11, wherein the data distribution optimization function further comprises:
determining if the average latency measured for communication between the database node and the alternative database node does not exceed any latency thresholds that are applicable to the subset of data.

15. The method of claim 14, further comprising:
identifying any further latency thresholds that are applicable to the subset of data;
identifying any of the plurality of database nodes that may handle data requests that relate to the subset of data; and
for each of the plurality of database nodes other than the further database node, determining if an average latency measured for communication between the database node and each of the identified database nodes exceeds one of the latency threshold and any of the further latency thresholds.

16. The method of claim 11, wherein comparing a measured latency to a latency threshold to determine if the latency threshold has been exceeded comprises:
comparing the measured latency to a latency threshold value, and determining that the latency threshold has been exceeded if the measured latency exceeds the latency threshold value for a data request handled by the database node for which the subset of data is one of stored and intended to be stored at the further database node.

17. The method of claim 11, wherein comparing a measured latency to a latency threshold to determine if the latency threshold has been exceeded comprises:
comparing the measured latency to a latency threshold value, and determining that the latency threshold has been exceeded if the latency threshold value has been exceeded for one of a pre-defined minimum number and pre-defined minimum proportion of the data requests handled by the database node for which the subset of data is one of stored and intended to be stored at the further database node.

18. The method of claim 11, further comprising determining the latency threshold in dependence upon one or more of:
(i) the data request type;
(ii) a database client that sent the data request;
(iii) an application that generated the data request;
(iv) the subset of data to which the data request relates;
(v) a value included within the subset of data; and
(vi) a type of value included within the subset of data.

19. A method of operating a database node of a distributed database, the distributed database comprising a plurality of database nodes each storing a set of data, the method comprising:
measuring a latency that occurs when the database node contacts a further database node in order to respond to one or more data requests that relate to a subset of data that is one of stored and intended to be stored at the further database node;
calculating an average latency value for communicating with each of the database nodes in the distributed database;
comparing the measured latency to a latency threshold to determine if the latency threshold has been exceeded;
if the latency threshold has been exceeded, comparing the latency threshold with the average latency measured for communications between each of the database nodes and determining if a latency for handling subsequent data requests relating to the subset of data could be reduced to below the latency threshold by storing the subset of data at an alternative database node other than the database node and the further database node;
sending notifications reporting the average latency values to data distribution optimization functions in the distributed database; and
reporting a latency measure to a further node of the distributed database.

20. The method of claim 19, wherein the latency measure is the latency measured for the most recent data request handled by the database node for which the subset of data is one of stored and intended to be stored at the further database node.

21. The method of claim 19, wherein the latency measure is an average of latencies measured for a plurality of data requests handled by the database node for which the subset of data is one of stored and intended to be stored at the further database node.

22. The method of claim 19, and further comprising:
receiving data requests from database clients;
for each data request:
determining if the data is one of stored and intended to be stored at the database node; and
if the data is one of not stored and not intended to be stored at the database node, forwarding the data request towards the further database node of the plurality of database nodes.

23. An apparatus configured to provide a data distribution optimization function within a distributed database, the distributed database comprising a plurality of database nodes each storing a set of data, the apparatus comprising:
a receiver configured to receive information on average latencies measured for communications between each of the database nodes and a measured latency from a database node of the plurality of database nodes, the measured latency being indicative of a latency that occurs when the database node contacts a further database node in order to respond to one or more data requests that relate to a subset of data that is one of stored and intended to be stored at the further database node;
an analysis unit configured to:
compare the measured latency to a latency threshold to determine if the latency threshold has been exceeded and,
if the latency threshold has been exceeded compare the latency threshold with the average latency measured for communication between each of the database nodes and determine if a latency for handling subsequent data requests relating to the subset of data could be reduced to below the latency threshold by storing the subset of data at an alternative database node other than the database node and the further database node, the alternative database node is any of the plurality of database nodes other than the database node and the further database node that may handle data requests relating to the subset of data; and
a data redistribution unit for causing at least the subset of data to be stored at the alternative database node.

24. The apparatus of claim 23, wherein the analysis unit is further configured to determine if the average latency measured for communication between the database node and the alternative database node does not exceed any latency thresholds that are applicable to the subset of data.

25. The apparatus of claim 24, wherein the analysis unit is further configured to:
identify any further latency thresholds that are applicable to the subset of data;

identify any of the plurality of database nodes that may handle data requests that relate to the subset of data; and for each of the plurality of database nodes other than the further database node, determine if an average latency measured for communication between the database node and each of the identified database nodes exceeds one of the latency threshold and any of the further latency thresholds.

26. The apparatus of claim 23, wherein the analysis unit is further configured to compare the measured latency to a latency threshold value, and determine that the latency threshold has been exceeded if the measured latency exceeds the latency threshold value for a data request handled by the database node for which the subset of data is one of stored and intended to be stored at the further database node.

27. The apparatus of claim 23, wherein the analysis unit is further configured to compare the measured latency to a latency threshold value, and determine that the latency threshold has been exceeded if the latency threshold value has been exceeded for one of a pre-defined minimum number and pre-defined minimum proportion of the data requests handled by the database node for which the subset of data is one of stored and intended to be stored at the further database node.

28. The apparatus of claim 23, wherein the analysis unit is further configured to determine the latency threshold in dependence upon one or more of:
(i) the data request type;
(ii) a database client that sent the data request;
(iii) an application that generated the data request;
(iv) the subset of data to which the data request relates;
(iv) a value included within the subset of data; and
(v) a type of value included within the subset of data.

29. An apparatus configured to operate as a database node of a distributed database, the distributed database comprising a plurality of database nodes each storing a set of data, the apparatus comprising:
a measurement unit configured to:
  measure a latency that occurs when the database node contacts a further database node in order to respond to one or more data requests that relate to a subset of data that is one of stored and intended to be stored at the further database node;
  calculate an average latency value for its communications with each of the database nodes in the distributed database;
compare the measured latency to a latency threshold to determine if the latency threshold has been exceeded;
if the latency threshold has been exceeded, compare the latency threshold with the average latency measured for communications between each of the database nodes and determining if a latency for handling subsequent data requests relating to the subset of data could be reduced to below the latency threshold by storing the subset of data at an alternative database node other than the database node and the further database node; and
generate notifications for reporting the average latency values to data distribution optimization functions in the distributed database; and
a transmitter configured to report a latency measure to a further node of the distributed database and for transmitting said notifications to the data distribution optimization functions.

30. The apparatus of claim 29, wherein the measurement unit is further configured to calculate the latency measure as the latency measured for the most recent data request handled by the database node for which the subset of data is one of stored and intended to be stored at the further database node.

31. The apparatus of claim 29, wherein the measurement unit is further configured to calculate the latency measure as an average of latencies measured for a plurality of data requests handled by the database node for which the subset of data is one of stored and intended to be stored at the further database node.

32. The apparatus of claim 29, and further comprising:
a receiver configured to receive, from a database client, a data request relating to a subset of data;
a request processing unit configured to determine if the subset of data is one of stored and intended to be stored at the database node; and
a transmitter configured to forward the data request towards a further database node of the plurality of database nodes if the subset of data is one of not stored and not intended to be stored at the database node.

* * * * *